United States Patent [19]

Johansson et al.

[11] 4,324,149

[45] Apr. 13, 1982

[54] GEAR SHIFT NOT REQUIRING ADJUSTMENT

[75] Inventors: Nils L. Johansson, Askim; Stig H. A. Weiertz, Kungalv, both of Sweden

[73] Assignee: AB Volvo, Gothenberg, Sweden

[21] Appl. No.: 76,748

[22] Filed: Sep. 18, 1979

[30] Foreign Application Priority Data

Sep. 28, 1978 [SE] Sweden .............................. 7810181

[51] Int. Cl.³ .................... G05G 5/18; G05G 7/16; G05G 9/18
[52] U.S. Cl. ................................. 74/473 R; 74/475; 74/491
[58] Field of Search ................... 74/473 R, 475, 476, 74/491, 538

[56] References Cited

U.S. PATENT DOCUMENTS

| | | | |
|---|---|---|---|
| 3,172,301 | 3/1965 | Hurst, Jr. et al. | 74/473 R |
| 3,250,143 | 5/1966 | Lyon | 74/473 R |
| 3,744,336 | 7/1973 | Lancaster | 74/473 R |
| 4,050,325 | 9/1977 | Shishido | 74/473 R |
| 4,086,822 | 5/1978 | Kuroda | 74/473 R |
| 4,132,124 | 1/1979 | Iida | 74/473 R |

FOREIGN PATENT DOCUMENTS

| | | |
|---|---|---|
| 2165629 | 7/1972 | Fed. Rep. of Germany . |
| 2400172 | 8/1974 | Fed. Rep. of Germany . |
| 531421 | 10/1921 | France .............................. 74/473 R |
| 2048140 | 3/1971 | France . |
| 2336269 | 7/1977 | France . |

*Primary Examiner*—Allan D. Herrmann
*Attorney, Agent, or Firm*—Young & Thompson

[57] ABSTRACT

A gear selector mechanism for automatic transmissions with a gear lever connected to the gearbox and movable in a selector gating for setting the correct gear position. The selector gating is connected to the gearbox in such a manner that the movements of the gearbox are transmitted uniformly to the gear lever and the gating, whereby their relative positions remain unchanged.

2 Claims, 4 Drawing Figures

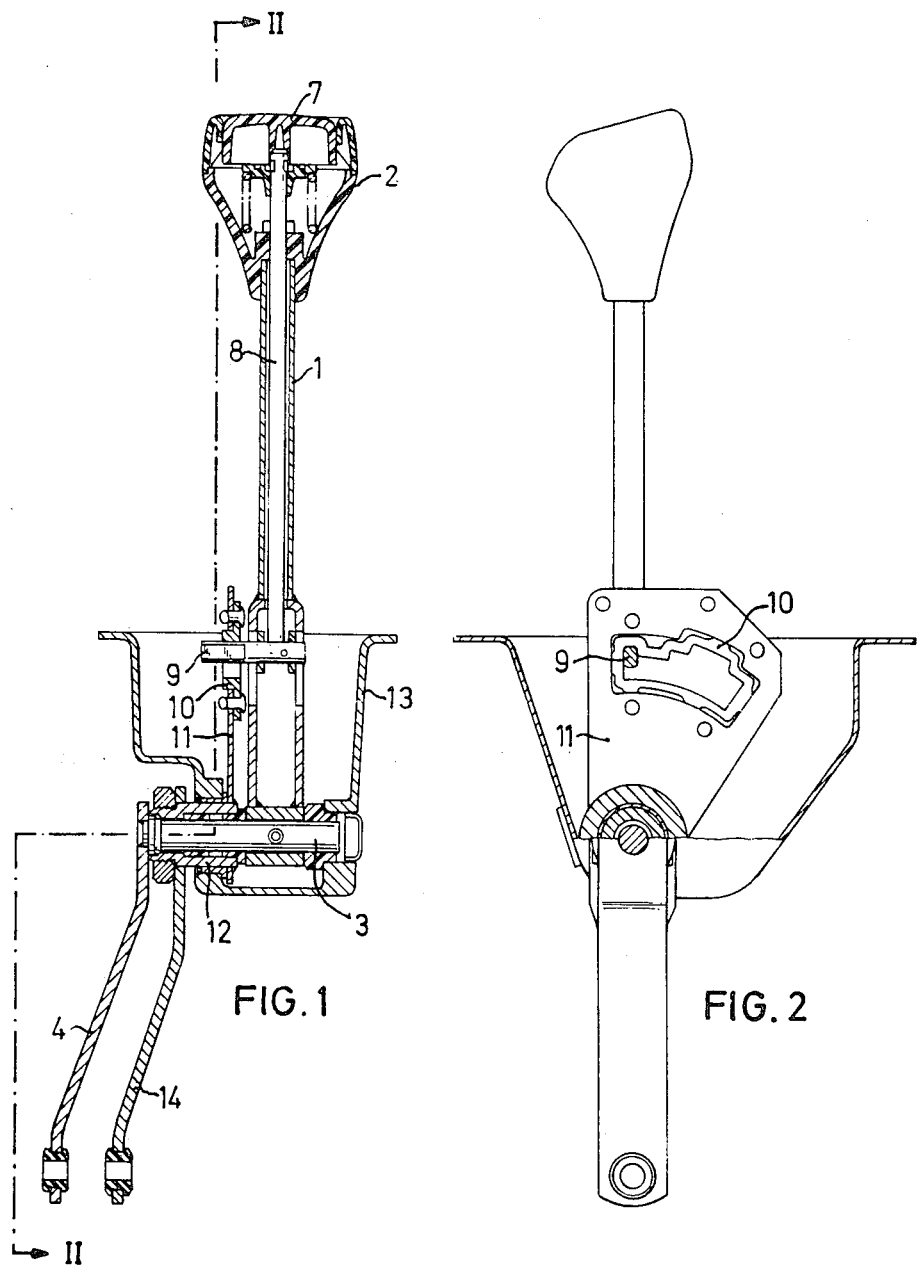

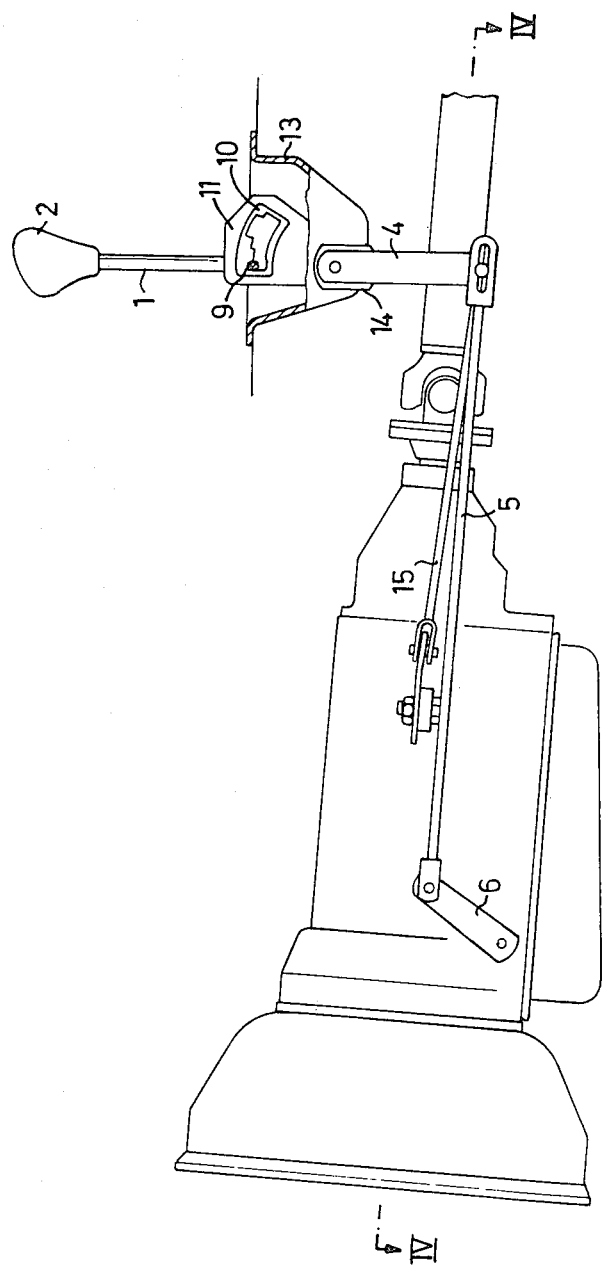
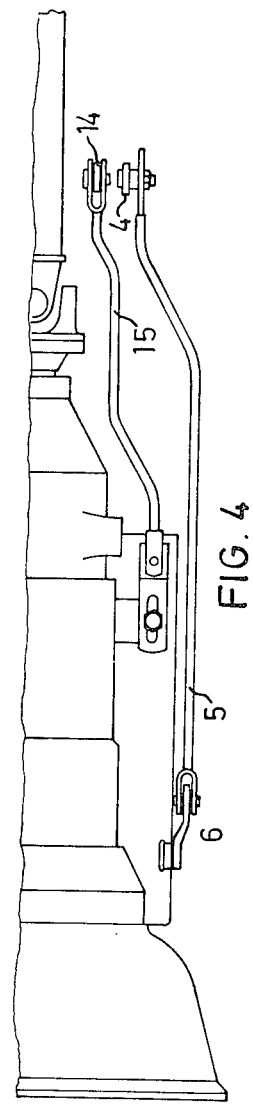

GEAR SHIFT NOT REQUIRING ADJUSTMENT

The present invention relates to an arrangement for operating automatic transmissions.

Most automobiles today are driven by an engine placed in the front portion of the car while driving the rear wheels. The engine has resilient suspension so that it can move during operation or its position can change for other reasons, such as wear etc. The gearbox is as rule rigidly fixed to the engine, so the same applies to the gearbox as to the engine as regards change of position.

The gear shift mechanism for automatic transmissions is constructed so that the shift lever is connected, via connecting levers and a control rod, to a gear selector valve inside the gearbox. This valve controls in turn the flow of oil to or from the various components and determines which of the various positions, e.g. P, R, N, D, 2 and 1, the gearbox is to operate in. To set the gear lever in these various positions, there is a selector gating with openings for the various shift positions. The placement of the gear lever in the gating and the position of the gear selector valve in the gearbox must coincide with each other exactly.

In all existing gear selectors, the gating is rigidly fixed to the body. This means that displacement of the gearbox and consequently of connecting levers, the control rod and gear lever in relation to the car body, will change the setting between the gating and the gear lever. The result of this is that the position of the gear lever in the gating no longer agrees with the position of the gear selector valve in the gearbox, thus creating a serious risk of malfunction. To avoid this, readjustment of the gear shift is required.

The purpose of the present invention is to achieve a gear selector mechanism for automatic transmissions with a gear lever which is movable in a gating for selecting the desired gear position, which does not require readjustments.

The gear selector mechanism according to the invention is therefore constructed, in contrast to all previously known gear selectors, so that the gating is connected to the gearbox in such a way that its movements are transmitted uniformly to the gear lever and the selector gating, so that their relative positions will remain unchanged regardless of the movements of the gearbox.

Two different types of gear selector mechanism are used for operating automatic transmissions. In one type, the gear lever pivots around a shaft which is suspended in the body in some manner, and in the second type, the gear lever moves rectilinearly in the longitudinal direction of the vehicle.

In the first type, shifting is done with a gear lever via a first connecting lever, a control rod and a second connecting lever resting on the gear selector shaft in the gearbox. According to the invention the selector gating is arranged so that it is connected to the gearbox via a connecting lever and a reaction rod which is rigidly mounted on the gearbox. Furthermore, the selector gating is journalled around the shift lever shaft, and the first connecting lever to the shift lever and the connecting lever to the selector gating are of equal length, so that the movements of the transmission will affect the gear lever and the gating to the same extent, so as to leave their relative positions unchanged, and thus no readjustments are necessary.

In the second type, the first connecting lever to the gear lever and the connecting lever to the gating can be eliminated, but otherwise it functions in approximately the same manner.

The invention will now be described in more detail with reference to the accompanying drawings, in which FIG. 1 shows a cross section of the gear selector mechanism according to an embodiment of the invention, FIG. 2 shows a view of the gear selector mechanism along the line II—II in FIG. 1, FIG. 3 shows a side view of the entire gear selector mechanism according to the invention together with the gearbox housing, and FIG. 4 shows a view of the gear selector mechanism along the line IV—IV in FIG. 3.

The embodiment of the invention shown in the drawings thus comprises a gear lever 1 with a grip 2, said gear lever being fixed to a shaft 3 which is pivotally journalled on the car body to actuate a connecting lever 4 and a control rod 5.

The control rod 5 drives in turn a lever 6 on the gear selector shaft of the gearbox within the gearbox housing. This transmission of motion is effected in a manner which is known per se and is thus not dealt with in more detail here.

In the grip 2 there is a button 7 rigidly connected to a push rod 8 which is placed inside the gear lever. At the lower end of the push rod there is a lock pin 9 with rounded edges. The pin, which can be riveted to the rod 8, for example, is arranged in the opening of a selector gating 10 and the placement of the pin in the gating determines the position of the gear lever and thereby the gear engaged.

The selector gating 10 can, for example, be made so that the gear lever 1 can be moved freely between certain positions, while movement to other positions requires pressing the button 7 which moves the pin 9 via the push rod 8 for movement from one opening to another in the gating 10.

The gating 10 is secured, for example by riveting, in a bracket made up of a plate 11 and a hollow shaft 12. The hollow shaft 12 is mounted in the gear lever housing 13 coaxial with the shaft 3 of the gear lever. On the hollow shaft 12, there is rigidly fixed a connecting lever 14 which is coupled via a reaction rod 15 to the gearbox.

In order that the movements of the gearbox will be transmitted uniformly to both the gear lever and the gating, the levers 4 and 14 have equal lengths.

The gear lever and the mechanism for transmitting movements to the gearbox within the gearbox housing need not necessarily be made as the embodiment above. Rather, as was mentioned previously, they can take other forms. For example, the pivoting movement of the gear lever can be replaced with a rectilinear movement, so that the lever is moved in a slot towards and from the gearbox. This eliminates the need for the first connecting lever to the gear lever as well as the lever connecting the selector gating to the gearbox housing.

What we claim is:

1. In a gear selector mechanism for automatic transmissions with a gear lever connected to a gearbox within a gearbox housing and movable in a selector gating for setting the correct gear position, in which the gear lever is connected to the gearbox via a connecting lever and a control rod, which is connected to a gear selector in the gearbox, and in which the gear lever is fixed to a shaft which is rotatably mounted relative to the car body; the improvement in which the selector gating is journalled around the same axis as the gear lever and is connected to the gearbox housing via a connecting lever and a reaction rod affixed to the gearbox housing, said connecting lever of the gear lever being of the same length as the connecting lever of the gating.

2. Gear selector mechanism according to claim 1, in which the selector gating is fixed to a bracket comprising a plate rigidly joined to a hollow shaft which is journalled around said shaft of the gear lever, the connecting lever of the selector gating being rigidly mounted on the hollow shaft.

* * * * *